United States Patent
Tamura et al.

(10) Patent No.: US 8,048,577 B2
(45) Date of Patent: Nov. 1, 2011

(54) HYDROGEN GENERATOR WITH A COMBUSTOR WITH A CONTROL UNIT

(75) Inventors: Yoshio Tamura, Nara (JP); Kiyoshi Taguchi, Osaka (JP); Akinari Nakamura, Osaka (JP); Hideo Ohara, Osaka (JP); Masataka Ozeki, Osaka (JP)

(73) Assignee: Panasonic Corporation, Osaka (JP)

( * ) Notice: Subject to any disclaimer, the term of this patent is extended or adjusted under 35 U.S.C. 154(b) by 554 days.

(21) Appl. No.: 12/302,400

(22) PCT Filed: Jun. 15, 2007

(86) PCT No.: PCT/JP2007/062121
§ 371 (c)(1),
(2), (4) Date: Nov. 25, 2008

(87) PCT Pub. No.: WO2007/145321
PCT Pub. Date: Dec. 21, 2007

(65) Prior Publication Data
US 2010/0062294 A1 Mar. 11, 2010

(30) Foreign Application Priority Data
Jun. 15, 2006 (JP) .................................. 2006-165855

(51) Int. Cl.
*H01M 8/06* (2006.01)
(52) U.S. Cl. ...................................................... 429/423
(58) Field of Classification Search .............. 429/423, 429/425, 427, 428, 429, 441; 422/198, 200
See application file for complete search history.

(56) References Cited

U.S. PATENT DOCUMENTS

| | | | | |
|---|---|---|---|---|
| 6,632,409 | B1* | 10/2003 | Kuwaba | 422/198 |
| 2003/0211373 | A1* | 11/2003 | Ueda et al. | 429/24 |
| 2005/0129997 | A1 | 6/2005 | Maenishi et al. | |
| 2009/0317671 | A1* | 12/2009 | Ukai et al. | 429/19 |
| 2010/0285377 | A1* | 11/2010 | Tamura et al. | 429/423 |
| 2010/0297513 | A1* | 11/2010 | Yasuda et al. | 429/423 |

FOREIGN PATENT DOCUMENTS

| | | |
|---|---|---|
| JP | 07-267604 | 10/1995 |
| JP | 2002-356305 | 12/2002 |
| JP | 2003-300704 | 10/2003 |
| JP | 2005-170784 | 6/2005 |

* cited by examiner

*Primary Examiner* — Chandrika Prasad
(74) *Attorney, Agent, or Firm* — McDermott Will & Emery LLP

(57) ABSTRACT

A hydrogen generator (1) includes: a reformer which generates a hydrogen-containing gas from a raw material and steam; a combustor (4) which heats the reformer; an evaporator (2) which generates the steam by utilizing heat of a combustion gas after the reformer is heated by the combustion gas; and a control unit (20), the hydrogen generator (1) is controlled such that ON and OFF of a combustion operation of the combustor (4) are repeated in a start-up operation of the hydrogen generator (1) and a temperature of the reformer is kept to a predetermined temperature or lower, and the control unit (20) controls the combustion operation such that a heat amount per unit time by the combustor (4) in a first combustion operation is larger than the heat amount per unit time in k-th (k>1) and following combustion operations.

12 Claims, 6 Drawing Sheets

|  | FIRST COMBUSTION OPERATION | SECOND COMBUSTION OPERATION | THIRD COMBUSTION OPERATION |
|---|---|---|---|
| RAW MATERIAL FLOW RATE | 2.0 NLM (SWITCHED FROM 1.5 NLM AT 180°C OR HIGHER) | 1.5 NLM | 1.5 NLM |
| FIRE EXTINGUISHING TEMPERATURE | 360°C | 370°C | 370°C |
| IGNITION TEMPERATURE | 150°C OR LOWER | 300°C | 250°C |
| AIR RATIO | STANDARD | HIGH | HIGH |
| WATER EVAPORATING TEMPERATURE | 90°C | 85°C | 85°C |

Fig. 3

HYDROGEN GENERATOR WITH A COMBUSTOR WITH A CONTROL UNIT

RELATED APPLICATIONS

This application is the US National Phase under 35 U.S.C. §371 of International Application No. PCT/JP2007/62121 filed on Jun. 15, 2007, which claims the benefit of Japanese Application No. JP 2006-165855 filed on Jun. 15, 2006, the disclosures of which Applications are incorporated by reference herein.

TECHNICAL FIELD

The present invention relates to a hydrogen generator which generates a hydrogen-containing gas by a steam-reforming reaction using as a main raw material a hydrocarbon-based material, such as natural gas, LPG; gasoline, naphtha, kerosene, or methanol, and a fuel cell system including the hydrogen generator.

BACKGROUND ART

In the hydrogen generator, a raw material containing an organic compound comprised of at least carbon and hydrogen is subjected to steam reforming by a reformer including a reforming catalyst layer. A hydrogen-containing gas is generated by this reforming reaction. When the amount of steam supplied to the reforming catalyst layer in the reforming reaction is inadequate as compared to the amount of the raw material supplied, only the raw material increases in temperature, and flows through the catalyst layer in the reformer and gas passages. Since the raw material contains as the main component the organic compound comprised of carbon and hydrogen, the raw material is thermally decomposed under this situation to be a carbon status, and the carbon deposits on the reforming catalyst and in the gas passages. This may cause a decrease in catalytic activity and clogging of the gas passages, thereby disturbing the operation of the hydrogen generator.

It is known that by intermittently carrying out combustion for heating the reformer until the temperature of an evaporator which supplies the steam to the reforming catalyst layer increases to a predetermined threshold or higher at the start-up of the hydrogen generator, the temperature of the reforming catalyst layer can be kept lower than the temperature at which the carbon deposition occurs (for example, see Patent Document 1 as a conventional example). When the temperature of the evaporator exceeds the predetermined threshold, the combustion continues, and water supply to the evaporator starts. This start-up method can prevent the reforming catalyst from deteriorating.

Patent Document 1: Japanese Laid-Open Patent Application Publication No. 2005-170784

DISCLOSURE OF THE INVENTION

Problems to be Solved by the Invention

However, in a case where the combustion using an inappropriate temperature range and heat amount of the reforming catalyst layer is repeated in the hydrogen generator of the conventional example, a time taken to increase the temperature of the evaporator to the predetermined threshold may become long. In this case, a time taken to start up the hydrogen generator becomes long. In addition, the number of times of start and stop of the combustion tends to be large. As a result, load with respect to a combustor and an igniting portion may increase, and the durability of a structure may also be affected.

An object of the present invention is to provide a hydrogen generator capable of increasing the temperature of the evaporator to a water-evaporable temperature within a shorter time than the hydrogen generator of the conventional example while, by repeating ON and OFF of a combustion operation of the combustor in a start-up operation of the hydrogen generator, maintaining the temperature of the reforming catalyst to a temperature lower than the temperature at which the carbon deposition of the raw material occurs, and a fuel cell system including the hydrogen generator.

Means for Solving the Problems

In order to solve the above problems, a hydrogen generator of the present invention includes: a reformer which generates a hydrogen-containing gas from a raw material and steam; a combustor which heats the reformer; an evaporator which generates the steam by utilizing heat of a combustion gas after the reformer is heated by the combustion gas; and a control unit, the hydrogen generator is controlled such that ON and OFF of a combustion operation of the combustor are repeated in a start-up operation of the hydrogen generator, and a temperature of the reformer is kept to a predetermined temperature or lower, and the control unit controls the combustion operation such that a heat amount per unit time by the combustor in a first combustion operation is larger than a heat amount per unit time by the combustor in k-th (k>1) and following combustion operations.

Moreover, the control unit may control the combustion operation such that the temperature of the reformer when carrying out OFF of the first combustion operation of the combustor is lower than the temperature of the reformer when carrying out OFF of the k-th (k>1) and following combustion operations.

Moreover, the control unit may control the combustion operation such that the temperature of the reformer when carrying out ON of n-th and following combustion operations of the combustor is lower than the temperature of the reformer when carrying out ON of an m-th (n>m>1) combustion operation of the combustor.

Moreover, the hydrogen generator may further include a water supplying unit which supplies water to the evaporator, and when a temperature of the evaporator becomes a predetermined threshold or higher, the control unit may not carry out OFF of the combustion operation of the combustor but continue the combustion operation of the combustor, and causes the water supplying unit to start supplying the water to the evaporator.

In this case, the predetermined threshold in the first combustion operation of the combustor may be higher than the predetermined threshold in m-th (m>1) and following combustion operations.

Moreover, the combustor may include a burner which burns a combustion fuel and air, a fuel supplying unit which supplies the combustion fuel to the burner, and an air supplying unit which supplies the air to the burner, and the control unit may control the combustion operation such that an air ratio of the burner in m-th (m>1) and following combustion operations is higher than an air ratio of the burner in the first combustion operation.

Moreover, an amount of the air supplied to the burner while the combustion operation is stopped may be larger than an amount of the air supplied to the burner during the combustion operation.

In the case of increasing the temperature of the evaporator to the water-evaporable temperature while, by repeating ON and OFF of the combustion operation of the combustor in the start-up operation of the hydrogen generator, maintaining the temperature of the reforming catalyst to a temperature lower than a temperature at which the carbon deposition of the raw material occurs, the hydrogen generator of the present invention can make the time taken to increase the temperature of the evaporator shorter than the hydrogen generator of the conventional example, and can make the time taken to start up the hydrogen generator shorter than the hydrogen generator of the conventional example by various controls of the combustor.

Moreover, the air ratio at a time of ignition of the burner may be lower than the air ratio in the combustion operation after the ignition of the burner.

With this, the igniting operation of the combustor may be appropriately carried out.

The hydrogen generator may further includes: a fuel gas passage through which a gas delivered from the reformer is supplied to the combustor; and a valve which is disposed on the fuel gas passage as the fuel supplying unit, wherein the control unit may open the valve when an internal pressure of the reformer reaches a predetermined threshold or higher while the combustion operation of the combustor is stopped.

With this, depressurizing of the reformer can be appropriately carried out.

Moreover, the hydrogen generator may further include a raw material supplying unit which supplies the raw material to the reformer, wherein the control unit may cause the raw material supplying unit to supply the raw material into the reformer when an internal pressure of the reformer becomes a predetermined threshold or lower while the combustion operation of the combustor is stopped.

With this, pressurizing of the reformer can be appropriately carried out.

A fuel cell system may include: the above-described hydrogen generator; and a fuel cell which generates electric power by using the hydrogen-containing gas supplied from the hydrogen generator and an oxidizing gas.

The above object, other objects, features and advantages of the present invention will be made clear by the following detailed explanation of preferred embodiments with reference to the attached drawings.

EFFECTS OF THE INVENTION

In the case of increasing the temperature of the evaporator to the water-evaporable temperature while, by repeating ON and OFF of the combustion operation of the combustor in the start-up operation of the hydrogen generator, maintaining the temperature of the reforming catalyst to a temperature lower than the temperature at which the carbon deposition of the raw material occurs, the hydrogen generator of the present invention can make the time taken to increase the temperature of the evaporator shorter than the hydrogen generator of the conventional example, and can make the time taken to start up the hydrogen generator shorter than the hydrogen generator of the conventional example. In addition, the hydrogen generator of the present invention can reduce the number of times of ON and OFF of the combustion operation of the combustor, reduce the load with respect to the combustor and igniting portion of the hydrogen generator, and improve the durability of the structure.

BRIEF DESCRIPTION OF THE DRAWINGS

FIG. 3 is a diagram showing results obtained by compiling the operating conditions in the first temperature increasing step of the hydrogen generator in Embodiment 1 of the present invention.

Figure 1:
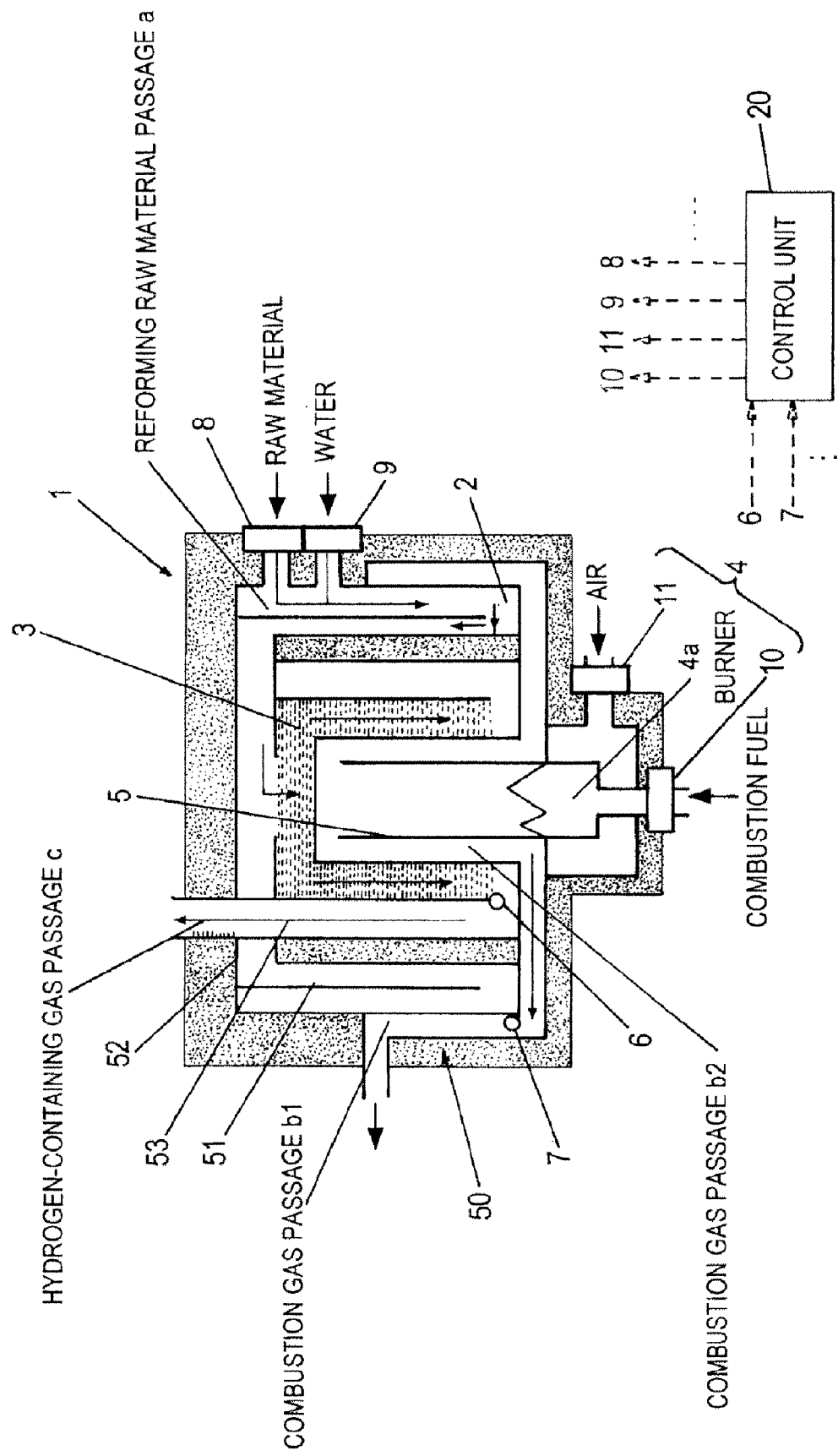
FIG. 1 is a schematic cross-sectional view showing the configuration of a hydrogen generator in Embodiment 1 of the present invention.

EXPLANATION OF REFERENCE NUMBERS 1 hydrogen generator
2 evaporator
3 reforming catalyst layer
4 combustor
5 radiating tube
6 reforming temperature detector
7 evaporator temperature detector
8 raw material supplying unit
9 water supplying unit
10 fuel supplying unit
11 air supplying unit
20 control unit
30 shift converter
31 CO remover
50 main body
51 vertical wall
52 horizontal wall
53 gap
101 fuel cell
200 fuel cell system

BEST MODE FOR CARRYING OUT THE INVENTION

Embodiment 1

Hereinafter, Embodiment 1 will be explained in reference to the drawings.

FIG. 1 is a schematic cross-sectional view showing the configuration of a hydrogen generator according to Embodiment 1 of the present invention, and especially shows in detail a reformer, i.e., a main component of a hydrogen generator 1, and its surrounding components.

As shown in FIG. 1, the hydrogen generator 1 is constituted by a cylindrical main body 50 whose upper and lower ends are closed, and includes: a raw material supplying unit 8 which adjusts the amount of raw material which is comprised of an organic compound containing carbon and hydrogen and supplied to a reformer including a reforming catalyst layer 3; a water supplying unit 9 which adjusts the amount of water supplied to the reformer; a combustor 4 which heats the reformer; a fuel supplying unit 10 which adjusts the amount of combustion fuel supplied to the combustor 4; an air supplying unit 11 which adjusts the amount of air supplied to the combustor 4; and a control unit 20. Specific examples of these supplying units are a flow rate control valve and a pump.

In the hydrogen generator 1, a plurality of cylindrical vertical walls 51 which are different in radius and axial length from one another are concentrically disposed inside the cylindrical main body 50. With this, the inside of the main body 50 are defined in a radial direction. A disc-shaped or hollow disc-shaped horizontal wall 52 is suitably disposed on predetermined end portions of the vertical walls 51. In detail, gaps 53 are formed between the vertical walls 51 by concentrically and perpendicularly disposing a plurality of the vertical walls 51 inside the main body 50, and the predetermined end portions of the vertical walls 51 are suitably closed by the horizontal wall 52 such that desired gas passages are formed by utilizing the gaps 53. Thus, a reforming raw material passage a, a combustion gas passage b1, a combustion gas passage b2, a hydrogen-containing gas passage c, and the reforming catalyst layer 3 are formed inside the main body 50, and these passages are formed in this order from an outer peripheral side of the main body 50 toward a center thereof in the radial direction of the main body 50.

An upstream end portion of the reforming raw material passage a is connected to the raw material supplying unit 8 and the water supplying unit 9 disposed outside the main body 50, and a downstream end portion of the reforming raw material passage a is connected to an upper end surface of the reforming catalyst layer 3. The reforming raw material passage a has a dual structure, and has a rising structure such that a moving direction of a material moving in the passage changes from a downward axial direction to an upward axial direction. An evaporator 2 is formed at a bottom portion of the reforming raw material passage a. As will be described later, water supplied from the water supplying unit 9 is evaporated by the evaporator 2, and is supplied to the reforming catalyst layer 3. An evaporator temperature detector 7 which detects the temperature of a wall corresponding to the evaporator is disposed on the evaporator 2. Herein, a thermocouple is disposed as the evaporator temperature detector 7. An installation location of the evaporator temperature detector 7 is not especially limited as long as it is such a location that the evaporator temperature detector 7 can detect the temperature of the vertical wall 51 or the horizontal wall 52 forming the evaporator 2. Herein, the evaporator temperature detector 7 is disposed to detect the temperature of an outer wall surface of the evaporator 2, and a temperature estimated from the detected temperature of the outer wall surface is regarded as the temperature of the evaporator 2. However, for example, the evaporator temperature detector 7 may be configured to directly detect the temperature of the bottom surface of an inner wall of the evaporator 2 or the temperature of water remaining at a bottom portion of the evaporator 2. Information about the temperature of the evaporator 2 detected by the evaporator temperature detector 7 is transmitted to the control unit 20. In accordance with this temperature information, the control unit 20 outputs a supply start signal, a supply stop signal, and a flow rate change signal to the raw material supplying unit 8, the water supplying unit 9, the fuel supplying unit 10, and the air supplying unit 11.

The reforming catalyst layer 3 is formed by filling up the gap 53 with reforming catalyst, and is disposed along an upper end surface and outer peripheral surface of a radiating tube 5 of the below-described combustor 4. Herein, the reforming catalyst containing Ru as the main component is used. However, the reforming catalyst is not especially limited as long as it enables the reforming reaction. For example, the reforming catalyst may be comprised of a precious metal, such as Pt or Rh, Ni, or the like. The upper end surface of the reforming catalyst layer 3 is connected to the reforming raw material passage a, and a lower end surface of the reforming catalyst layer 3 is connected to an upstream end portion of the hydrogen-containing gas passage c. A reforming temperature detector 6 which detects the temperature of a gas having passed through the reforming catalyst layer 3 and flowing in the passage is disposed inside the hydrogen-containing gas passage c. Herein, a thermocouple is disposed as the reforming temperature detector 6. An installation location of the reforming temperature detector 6 is not especially limited as long as it is such a location that the reforming temperature detector 6 can directly or indirectly detect the temperature of the reformer. Herein, the reforming temperature detector 6 is disposed to detect the temperature of the gas which has just passed through the reforming catalyst layer 3, and the detected temperature of the gas is regarded as the temperature of the reformer. However, for example, the reforming temperature detector 6 may be configured to directly detect the temperature inside the reforming catalyst layer 3, or may be configured to detect the temperature of the vertical wall 51 or the horizontal wall 52 forming the reforming catalyst layer 3. Information about the temperature of the reformer detected by the reforming temperature detector 6 is transmitted to the control unit 20. In accordance with this temperature information, the control unit 20 outputs the supply start signal, the supply stop signal, and the flow rate change signal to the raw material supplying unit 8, the water supplying unit 9, the fuel supplying unit 10, and the air supplying unit 11.

The combustor 4 is constituted by a burner 4a, and burns a combustion fuel supplied from the fuel supplying unit 10 and air supplied from the air supplying unit 11 to generate a flame. The radiating tube 5 is disposed at an upper portion of the combustor 4, is stored inside the main body 50 of the hydrogen generator 1, and is disposed concentrically with the main body 50 of the hydrogen generator 1. Flame is generated inside the radiating tube 5, and its combustion gas flows through the combustion gas passage b2 inside the hydrogen generator 1. The combustion gas passage b2 and the combustion gas passage b1 are communicated with each other at their bottom portions, and a downstream end portion of the combustion gas passage b1 is configured such that the combustion gas can be taken out to the outside of the hydrogen generator 1.

The control unit 20 is constituted by a computer, such as a microcomputer. The control unit 20 controls the raw material supplying unit 8, the water supplying unit 9, the fuel supplying unit 10, and the air supplying unit 11 to adjust supply amounts of the raw material, the water, the combustion fuel, and the air. Each of the raw material supplying unit 8, the water supplying unit 9, the fuel supplying unit 10, and the air supplying unit 11 is configured to be able to adjust the flow rate of a supply target. For example, each of these supplying unit 8, 9, 10, and 11 may be configured to include a mechanical or electrical actuating device, such as a pump or a fan, and configured such that the actuating device is controlled by the control unit 20 to adjust each supply flow rate. Moreover, each of these supplying unit 8, 9, 10, and 11 may be configured such that a flow rate adjuster, such as a valve, is further disposed at a downstream passage of the actuating device, and the flow rate adjuster is controlled by the control unit 20 to adjust each supply amount.

Next, the outline of a start-up operation of the hydrogen generator 1 will be explained. The start-up operation of the hydrogen generator 1 starts in accordance with a start-up command output from the control unit 20. This start-up operation mainly includes a step (hereinafter referred to as a first temperature increasing step) of heating the evaporator 2 to such a temperature that the evaporator 2 can generate steam, and a step (hereinafter referred to as a second temperature increasing step) of heating the reformer to a reforming reaction temperature while supplying the water to the evaporator 2 heated to the above temperature. When the second temperature increasing step is completed, and adequate hydrogen is generated by the reforming reaction in the reforming catalyst layer 3, the start-up operation is completed, and a normal operation (hereinafter referred to as a hydrogen generating step) of the hydrogen generator 1 is started.

In the first temperature increasing step, the temperature detected by the reforming temperature detector 6 is kept to a first predetermined temperature or lower until the temperature detected by the evaporator temperature detector 7 reaches a water-evaporable temperature. The first predetermined temperature is a temperature at which the reforming catalyst does not deteriorate in the absence of steam and the carbon deposition of the supplied raw material does not occur in the absence of steam. It is preferable that a set temperature of the first predetermined temperature be in a range from 300 to 500° C. In the present embodiment, the set temperature of the first predetermined temperature is 380° C. or lower. The set temperature of the first predetermined temperature may be the other temperature as long as it is a temperature at which the reforming catalyst does not deteriorate and the carbon deposition of the raw material does not occur.

When the temperature detected by the evaporator temperature detector 7 exceeds the water-evaporable temperature, the process switches from the first temperature increasing step to the second temperature increasing step. When the temperature of the reforming catalyst layer 3 reaches the reforming reaction temperature (for example, 500° C. to 700° C.) by the second temperature increasing step, a hydrogen-containing gas is generated from the raw material and the steam by the reforming reaction using the reforming catalyst, and thereby, the process switches from the second temperature increasing step to the hydrogen generating step. Herein, a period from the start of the combustion of the combustor 4 to the supply of the water to the evaporator 2 is called a first temperature increasing time as a time taken to carry out the first temperature increasing step of the hydrogen generator 1.

The operations of the hydrogen generator 1 in the first temperature increasing step, the second temperature increasing step, and the hydrogen generating step are controlled by the control unit 20.

At the beginning of the start-up of the hydrogen generator 1 (first temperature increasing step), the fuel supplying unit 10 supplies the combustion fuel at a predetermined flow rate to the combustor 4, and the air supplying unit 11 supplies the air at a predetermined flow rate to the combustor 4. The combustor 4 generates a flame inside the radiating tube 5 by the combustion reaction between the supplied combustion fuel and air. The reforming catalyst layer 3 in the reformer is heated by combustion heat generated by the combustion, and is heated also by potential heat of the combustion gas which is introduced from the radiating tube 5 to the combustion gas passage b2 and flows in the passage.

Further, the combustion gas is introduced from the combustion gas passage b2 to the combustion gas passage b1, and flows in the passage. Since the combustion gas passage b1 is in contact with the reforming raw material passage a via the vertical wall 51, the heat of the combustion gas flowing through the combustion gas passage b1 is transferred to the reforming raw material passage a. Thus, the evaporator 2 disposed on an inner peripheral side of the combustion gas passage b1 via the vertical wall 51 is heated. As above, both the reformer (reforming catalyst layer 3) and the evaporator 2 are heated by the combustion of the combustor 12, and the reformer (reforming catalyst layer 3) located on an upstream side in a heat transfer passage is heated before the evaporator 2 located on a downstream side in the heat transfer passage is heated.

When heating the reformer, the temperature of the hydrogen-containing gas having passed through the reforming catalyst layer 3 is detected by the reforming temperature detector 6, and the detected temperature of the hydrogen-containing gas is transmitted to the control unit 20. When the temperature detected by the reforming temperature detector 6 reaches the first predetermined temperature or higher, the temperature of the evaporator 2 is detected by the evaporator temperature detector 7. When the detected temperature of the evaporator 2 is a predetermined threshold or higher, it is determined that water evaporation can be carried out by the evaporator 2. In this case, water supply to the reformer is started, and the hydrogen generator 1 proceeds to the second temperature increasing step. The predetermined temperature set for the reformer and the predetermined threshold set for the evaporator 2 will be described later.

In the present embodiment, in the start-up operation and steady operation of the hydrogen generator 1, the hydrogen-containing gas having flown through the hydrogen-containing gas passage c is supplied to the combustor 4 as the combustion fuel via a passage, not shown, the amount of the combustion fuel supplied to the combustor 4 is adjusted by the raw material supplying unit 8, and the raw material supplying unit 8 functions as a fuel supplying unit of supplying fuel to the combustor 4. However, the present embodiment may be configured such that the combustion fuel is supplied via a passage on which the fuel supplying unit 10 is disposed as shown in FIG. 1 in addition to the passage extending from the hydrogen-containing gas passage c to the combustor 4, and the raw material supplying unit 8 and the fuel supplying unit 10 function as a combustion fuel supplying unit. In this case, for example, the raw material supplying unit 8 may be operated such that: until the combustion fuel having passed through the hydrogen-containing gas passage c in the start-up operation is supplied to the combustor 4, the combustion fuel is supplied to the fuel supplying unit 10 for ignition and combustion; and when the combustion fuel having passed through the hydrogen-containing gas passage c is supplied to the combustor 4, only the combustion fuel having passed through the hydrogen-containing gas passage c is supplied to the combustor 4. Moreover, the raw material supplying unit 8 may be configured such that: the combustion fuel is supplied to the combustor 4 from only the fuel supplying unit 10 until the second temperature increasing step is completed; and when starting generating hydrogen, the raw material is supplied from the raw material supplying unit 8.

Meanwhile, when the temperature detected by the reforming temperature detector 6 reaches the first predetermined temperature or higher, the temperature of the evaporator 2 is detected by the evaporator temperature detector 7. When the detected temperature of the evaporator 2 is lower than the predetermined threshold, it is determined that the water evaporation cannot be carried out by the evaporator 2. In this case, the combustion operation of the combustor 4 is stopped, and the amount of air supplied from the air supplying unit 11 is increased to cool down the reforming catalyst layer 3 by the air. In the present specification, an operation in which the combustion operation of the combustor 4 is carried out is defined as "ON", and an operation in which the combustion operation of the combustor 4 is stopped is defined as "OFF".

Moreover, in the present specification, the "combustion operation" of the combustor 4 is defined as a temperature increasing operation of the combustor 4 which can increase the temperature of the reformer by a predetermined temperature. Therefore, the "combustion operation" does not include such combustion failure that the combustor 4 has been ignited but soon extinguishes its flame due to unstable combustion or the like, or just an "igniting operation" of the combustor 4 which does not contribute to the increase in temperature of the reforming catalyst layer 3.

When the combustion operation of the combustor 4 is stopped, and the temperature detected by the reforming temperature detector 6 becomes the second predetermined temperature or lower, the combustion operation of the combustor 4 is restarted. When the temperature detected by the reforming temperature detector 6 reaches the first predetermined temperature or higher again, the temperature of the evaporator 2 is detected by the evaporator temperature detector 7. Then, whether or not the detected temperature of the evaporator 2 is the predetermined threshold or higher is determined to determine whether to stop the combustion operation of the combustor 4 or proceed to the second temperature increasing step.

In the second temperature increasing step, the raw material supplied from the raw material supplying unit 8 and the steam generated by causing the water supplied from the water supplying unit 9 to be evaporated by the evaporator 2 flow through the reforming raw material passage a to be supplied to the reforming catalyst layer 3. After passing through the reforming catalyst layer 3, the raw material and the steam are supplied to the hydrogen-containing gas passage c. The gas having passed through the reforming catalyst layer 3 is taken out to the outside of the reformer via the hydrogen-containing gas passage c. When the temperature of the reforming catalyst layer 3 heated in a state where the raw material and the steam pass therethrough reaches the reforming reaction temperature, the reforming reaction is carried out by the raw material and the steam to generate hydrogen. It should be noted that the reforming reaction is not suddenly started at a certain threshold temperature. That is, when the temperature of the reforming catalyst layer 3 reaches about 500° C., a part of the supplied raw material and a part of the supplied steam start reacting with each other, and the ratio of the reacting raw material and steam to the entire raw material and steam increases as the increase in temperature. When the temperature of the reforming catalyst layer 3 reaches about 700° C., the raw material and the steam almost completely react with each other. Therefore, in the second temperature increasing step in which the reformer is heated in a state where the raw material and the steam are supplied, the reforming reaction is suitably started when a condition of the temperature detected by the reforming temperature detector 6 is met. Herein, a state in which the temperature detected by the reforming temperature detector 6 is about 700° C. for example, and the raw material and the steam supplied to the reformer almost completely react with each other to generate hydrogen is called the hydrogen generating step. Therefore, although the operation of heating the reformer until the reforming catalyst layer 3 reaches the reforming reaction temperature is defined as the second temperature increasing step, hydrogen is partially generated by the reforming reaction from the raw material and the steam even in the period of the second temperature increasing step.

Note that the hydrogen generating step of the hydrogen generator 1 is the same as a normal operation of an existing hydrogen generator 1. To be specific, the hydrogen-containing gas containing hydrogen as the main component is generated in the reforming catalyst layer 3 by using the raw material and the steam supplied to the reforming catalyst layer 3 via the reforming raw material passage a and the reforming catalyst. The generated hydrogen-containing gas is taken out to the outside of the reformer via the hydrogen-containing gas passage c, and is utilized in suitable applications (for example, utilized as an electric power generating fuel of a below-described fuel cell system).

Next, details of the operation of the first temperature increasing step will be explained in reference to the drawings.

Figure 2:
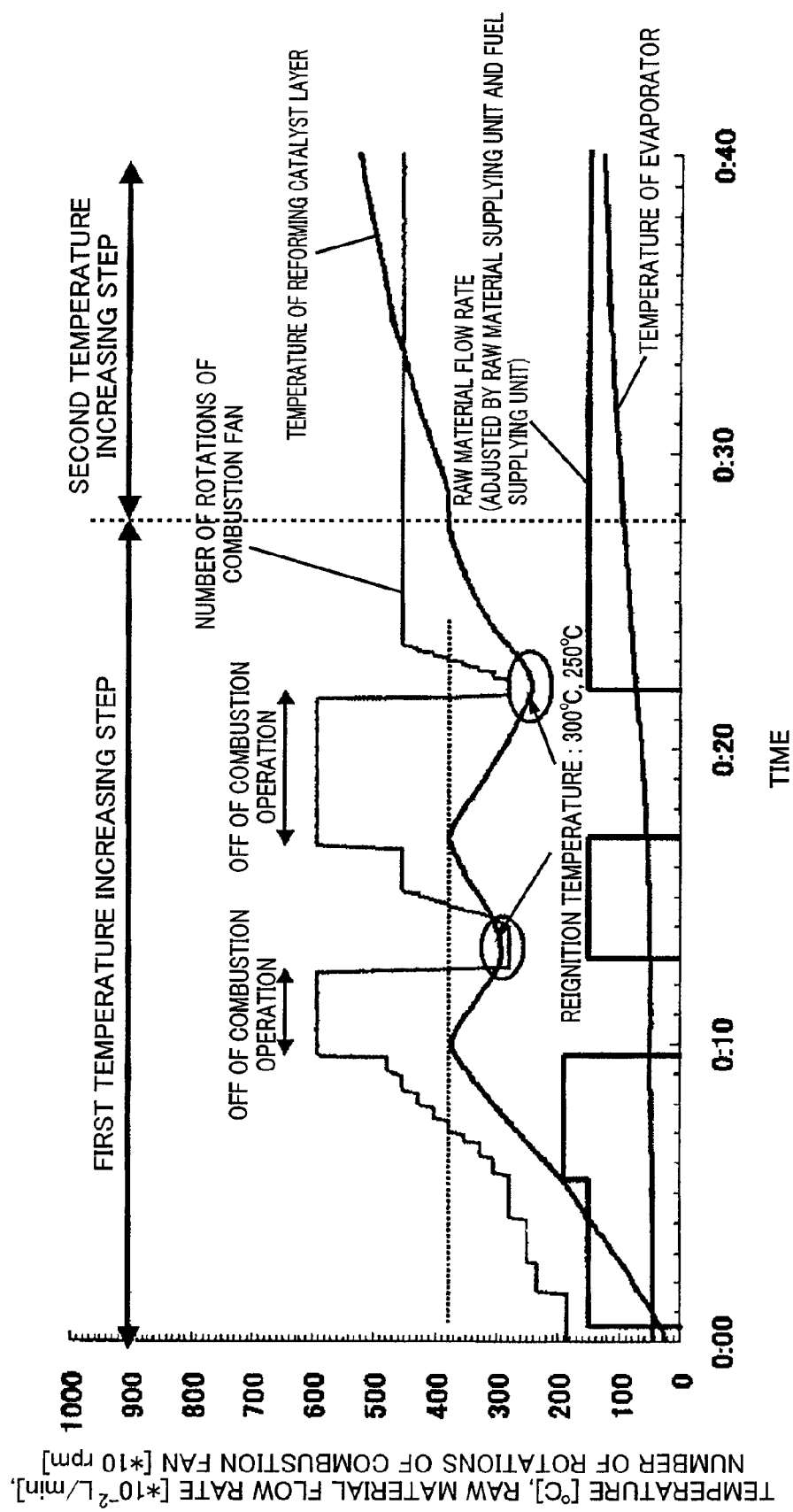
FIG. 2 is a diagram schematically showing time-lapse changes of various operating conditions in a first temperature increasing step and a second temperature increasing step in a start-up operation using the hydrogen generator of Embodiment 1 of the present invention.

FIG. 2 is a diagram schematically showing time-lapse changes of various operating conditions in the first temperature increasing step and (in up to an intermediate point of) the second temperature increasing step in the start-up operation using the hydrogen generator according to Embodiment 1 of the present invention. In FIG. 2, a horizontal axis denotes an elapsed time (hour:minute) since the beginning of the start-up of the hydrogen generator 1, and representative examples of the operating conditions of the hydrogen generator 1 are: the temperature (° C.) detected by the reforming temperature detector 6; the temperature (° C.) of the evaporator 2 detected by the evaporator temperature detector 7; the flow rate (abbreviated as "raw material flow rate" in the following explanation and the drawings according to need) (numerical value $\times 10^{-2}$ NLM; liter (L)/minute (min)[normal]) of the fuel of the combustor 4 adjusted by the raw material supplying unit 8 and the fuel supplying unit 10; and the number of rotations (numerical value$\times$10 rpm) of a combustion fan, i.e., the air supplying unit 11 adjusted by the combustion fan.

First, when starting the start-up operation of the hydrogen generator 1, the control unit 20 checks the temperature detected by the reforming temperature detector 6 to confirm whether or not the temperature is such a temperature that the catalyst deterioration and the carbon deposition of the raw material do not occur even when the raw material is supplied to the reforming catalyst layer 3. If the temperature is such a temperature that the catalyst deterioration and the carbon deposition of the raw material occur, air is supplied from the air supplying unit 11 to cool down the reforming catalyst layer 3. Then, the start-up operation is started. When the temperature of the reforming catalyst layer 3 is equal to or lower than such a temperature that the catalyst deterioration and the carbon deposition of the raw material do not occur even when the raw material is supplied, the raw material is supplied to the reformer from the raw material supplying unit 8, and thus, the gas in the reformer is replaced with the raw material. With these operations, even when the temperature of the evaporator 2 has not reached the water-evaporable temperature, and the temperature of the reforming catalyst layer 3 is such a high temperature that the carbon deposition of the raw material occurs, the gas inside of the reformer can be appropriately replaced with the raw material.

In the present embodiment, the raw material used for the replacement is supplied as the combustion fuel to the combustor 4 via the hydrogen-containing gas passage c, and is used for the combustion of the combustor 4. The gas used for the replacement does not have to be used for the combustion of the combustor 4. For example, the gas used for the replacement may be diluted by the air, which is supplied from the air supplying unit, to a level at which the gas is burnable, and discharged to the atmosphere. In the present embodiment, the raw material is caused to flow through the hydrogen generator 1 (reformer) in the start-up operation because the raw material is used as a heat exchange medium of heating the entire hydrogen generator 1 to speed up the increase in temperature of the entire hydrogen generator 1. Therefore, it is preferable that the supply of the raw material to the hydrogen generator 1 be carried out in the start-up in addition to the replacement operation.

Next, the reformer is heated by burning in the combustor 4 the combustion fuel supplied from the hydrogen-containing gas passage c and a passage on which the fuel supplying unit 10 is disposed and the air supplied from the air supplying unit 11. In the present embodiment, a combustion method of the combustor 4 is diffusion combustion. However, it may be premix combustion as long as the combustion can be carried out. The reforming catalyst layer 3 is heated by the combustion of the combustor 4, and the temperature detected by the reforming temperature detector 6 also increases.

Here, the control unit 20 controls the combustion operation (specifically, the operation of the raw material supplying unit 8) of the combustor 4 such that the flow rate (corresponding to the "raw material flow rate" shown in FIG. 2 as the operating condition) of the combustion fuel supplied to the combustor 4 is increased only in the first combustion operation, and thus, a heat amount per unit time is increased. In the present embodiment, as shown in FIG. 2, the flow rate (raw material flow rate) of the combustion fuel in the first combustion operation is adjusted to 2.0 NLM by the control unit 20, and the flow rate of the combustion fuel in the second and following combustion operations are adjusted to 1.5 NLM by the control unit 20. Since the temperature inside the reformer is not adequately high in the first combustion operation, a large amount of heat is required to heat the entire reformer. This is because if the amount of heat per unit time supplied from the combustor 4 is not increased, a time taken to heat the reforming catalyst layer 3 to the first predetermined temperature becomes long, and thereby, a time taken to carry out the first temperature increasing step becomes long. Since the temperature of the entire reformer is high in the second and following combustion operations, it is preferable that the flow rate of the combustion fuel be lower than that in the first combustion operation. Note that the flow rate of the combustion fuel at the time of the ignition of the combustor 4 in the first combustion operation is equal to that in the second and following combustion operations. To be specific, as shown in FIG. 2, the flow rate at the time of rising of the raw material fuel, which corresponds to the time of the ignition of the combustor 4, is adjusted to 1.5 NLM in both the first combustion operation and the second and following combustion operations. A purpose of adjusting the flow rate is to keep the stability of the ignition of the combustor 4. Therefore, the flow rate of the combustion fuel at the time of the ignition in the first combustion operation may be set to be higher than that in the second and following combustion operations as long as the ignition can be stably carried out.

Moreover, an air ratio of the combustor 4 at the time of the ignition of the combustor 4 may be set to be lower than the air ratio of the combustor 4 in the combustion operation of the combustor 4 after the ignition. With this, it is expected that the air ratio of the combustor 4 at the time of ignition of the combustor 4 becomes close to "1", and the ignition of the combustor is facilitated.

Moreover, the control unit 20 controls the operations of the raw material supplying unit 8 and the air supplying unit 11 such that the air ratio of the combustor 4 in the second and following combustion operations is higher than the air ratio of the combustor 4 in the first combustion operation. To be specific, the ratio of the air to the combustion fuel in the second and following combustion operations is higher than that in the first combustion operation.

Note that the above-described air ratio refers to a ratio ($A/A_0$) of an amount A of the air actually supplied, to a theoretical amount (minimum mount of air necessary to completely burn the combustion fuel) $A_0$ of the air. Incomplete combustion of the combustion fuel occurs when the air ratio is lower than "1".

As the air ratio increases, the ratio of the air to the combustion fuel increases, and a flow velocity of the combustion gas changes. Therefore, when the air ratio increases, heat is more likely to be transferred to the evaporator 2 which carries out the heat exchange with the combustion gas passage b1 and the combustion gas passage b2, whereas the heat is less likely to be transferred to the reforming catalyst layer 3. On this account, the air ratio is adjusted to be low in the first combustion operation such that the reforming catalyst layer 3 located on an upstream side of the combustion gas is easily heated (for example, the air ratio is adjusted to a standard air ratio used in a normal combustion operation of the combustor 4), and the air ratio is adjusted to be high in the second and following combustion operations such that the evaporator 2 is easily heated (for example, the air ratio is adjusted to exceed the above-described standard air ratio).

The number of rotations of the combustion fan is shown in FIG. 2 as the operating condition corresponding to the flow rate of the air supplied to the combustor 4. FIG. 2 shows that the number of rotations of the combustion fan tends to substantially monotonically increase in the combustion operation of the combustor 4. It is understood that: the increase in temperature of the reformer is appropriately handled by increasing the number of rotations of the combustion fan; and the output of the air supplying unit 11 is adjusted such that when the flow rate (raw material flow rate) of the combustion fuel supplied to the combustor 4 is constant, the flow rate of the air supplied to the combustor 4 also becomes constant. When the temperature of the reformer increases, airflow resistance produced when supplying the air to the combustor by the air supplying unit 11 increases because of volume expansion of the combustion fuel discharged from the reformer to reach the combustor 4 and the decrease in volume shrinkage ratio of the combustion gas due to the increase in temperature of the hydrogen generator 1. Therefore, as shown in FIG. 2, if the number of rotations of the combustion fan is not increased, the flow rate of the air cannot be kept constant.

In the combustion operation, the control unit 20 heats the reformer by the combustor 4, and detects the temperature of the evaporator 2 by the evaporator temperature detector 7 when the temperature detected by the reforming temperature detector 6 has reached the first predetermined temperature or higher. Here, the first predetermined temperature of the reforming catalyst layer 3 is such a temperature that the reforming catalyst does not deteriorate, and the carbon deposition of the raw material does not occur under a situation where there is no water. To be specific, the first predetermined temperature is set as a reference temperature for determining whether or not the evaporator 2 can evaporate the water, and as described above, is set to a temperature lower than the temperature at which the carbon deposition of the raw material occurs in the reforming catalyst layer 3.

In the case of the above-described material of the reforming catalyst layer 3, a specific set temperature is preferably in a range from 300 to 500° C. In the present embodiment, it is set to 380° C. or lower. For example, the first predetermined temperature is set to 360° C. in the first combustion operation, and 370° C., i.e., a higher temperature than the above in the second and following combustion operations. The reason why the first predetermined temperature is changed between the first combustion operation and the second and following combustion operations is that the flow rate of the combustion fuel is different therebetween. In the present embodiment, as described above, the flow rate of the combustion fuel in the first combustion operation is higher than that in the second and following combustion operations. Therefore, when the combustion operation is stopped, the temperature of the reforming catalyst layer 3 tends to overshoot in the first combustion operation. On this account, in order to keep the temperature detected by the reforming temperature detector 6 to 380° C. or lower, it is necessary that the first predetermined temperature is 360° C. in the first combustion operation, and 370° C. in the second and following combustion operations. The set temperature is not limited to 380° C. or lower, since it changes depending on the configuration of the hydrogen generator 1, the catalyst to be used, a temperature detecting method, and the like. Moreover, the first predetermined temperature should be set appropriately for each generator because the tendency of occurrence of the overshoot of the temperature of the reforming catalyst layer 3 when the combustion is stopped changes depending on the configuration of the hydrogen generator 1, the catalyst to be used, the temperature detecting method, and the like.

When the temperature detected by the reforming temperature detector 6 has reached the first predetermined temperature or higher determined due to the above reasons, the control unit 20 detects the temperature of the evaporator 2 by the evaporator temperature detector 7 to determine whether or not the temperature of the evaporator 2 is the water-evaporable temperature. Here, the water-evaporable temperature should be set to 100° C. or higher. However, in the configuration of the present embodiment, as described above, since the evaporator temperature detector 7 is disposed on the outer wall surface of the vertical wall 51 or the horizontal wall 52 forming the evaporator 2, the temperature detected by the evaporator temperature detector 7 is lower than an actual internal temperature of the evaporator 2. Therefore, the water-evaporable temperature detected by the evaporator temperature detector 7 as the water-evaporable temperature is set to a temperature lower than 100° C., i.e., 90° C. in the first combustion operation and 85° C. in the second and following combustion operations. The set value of the water-evaporable temperature is changed between the first combustion operation and the second and following combustion operations in order to deal with a case where the start-up is carried out in a state where the temperature of the hydrogen generator 1 is still high after the operation of the hydrogen generator 1 is stopped (hereinafter referred to as a hot start). When the hot start of the hydrogen generator 1 is carried out, the temperature of the evaporator 2 is high at the beginning of the start-up. However, the temperature of the evaporator 2 may tend to decrease in the first combustion operation of the first temperature increasing step. To be specific, in the present embodiment, as described above, since the air ratio in the combustion of the combustor 4 is low in the first combustion operation, the evaporator 2 is less likely to be heated in the first combustion operation than in the second and following combustion operations. Therefore, in a case where the water-evaporable temperature in the first combustion operation and the water-evaporable temperature in the second and following combustion operations are set to the same set value (85° C. herein), an adequate amount of heat may not be supplied to the evaporator 2 after it is determined that the evaporator 2 can evaporate the water. On this account, the temperature of the evaporator 2 may keep on decreasing, and when the water is supplied from the water supplying unit 9, the water may not be evaporated. Therefore, the set value of the water-evaporable temperature in the first combustion operation is set to be higher than the set value of the water-evaporable temperature in the second and following combustion operations.

The control unit 20 uses the set value of the water-evaporable temperature to determine whether or not the temperature of the evaporator 2 is the water-evaporable temperature. When the temperature of the evaporator 2 is the water-evaporable temperature (when the temperature detected by the evaporator temperature detector 7 is equal to or higher than the set value of the water-evaporable temperature), the water is supplied from the water supplying unit 9 while continuing the combustion operation of the combustor 4, and the process proceeds to the second temperature increasing step. The operations thereafter have already been described above, so that explanations thereof are omitted. In contrast, when the temperature of the evaporator 2 is not the water-evaporable temperature (when the temperature detected by the evaporator temperature detector 7 is lower than the set value of the water-evaporable temperature), in order to keep the temperature detected by the reforming temperature detector 6 to 380° C. or lower, the combustion operation of the combustor 4 is stopped by stopping supplying the combustion fuel from the fuel supplying unit 10. For example, the control unit 20 closes the flow rate control valve of the raw material supplying unit 8 to stop the combustion operation of the combustor 4. Moreover, in order to cool down the reforming catalyst layer 3 by the air, the amount of air supplied from the air supplying unit 11 to the combustor 4 is increased as compared to the amount of air in the combustion operation. At this time, since the temperature of the reforming catalyst layer 3 is higher than the temperature of the evaporator 2, heat is transferred from the reforming catalyst layer 3 to the evaporator 2 by the air used to cool down the reforming catalyst layer 3, so that heating the evaporator 2 is carried out while the combustion is stopped.

Since a temperature distribution of the entire reformer and hydrogen generator 1 changes while the reforming catalyst layer 3 is cooled down by the air, the temperature of the raw material filled in the reformer and the hydrogen generator 1 changes, and the volume thereof also changes. The temperature change of the reforming catalyst layer 3 differs between a portion on an upstream side of the air cooling and a portion on a downstream side of the air cooling. When the temperature of the reforming catalyst layer 3 increases, the volume thereof expands, and an internal pressure increases. When the temperature of the reforming catalyst layer 3 decreases, the volume thereof contracts, and the internal pressure decreases. If the pressure inside the generator becomes too high or too low, the pressure may be applied to devices, such as a valve and a supply pump disposed in the reformer, and the structure of the reformer, causing these devices to degrade their durability and to be damaged. Therefore, in a case where the internal pressure of the reformer exceeds a predetermined value, the control unit 20 causes an on-off valve (not shown) disposed on a passage extending from the hydrogen-containing gas passage c to the combustor 4 to temporarily open, thereby discharging the gas (combustible gas, such as the raw material and the like) from the reformer to the combustor 4 for depressurizing. Thus, the internal pressure of the reformer can be decreased. The combustible gas discharged to the combustor 4 is diluted inside the combustor 4 by the air supplied by the air supplying unit 11, and is discharged to the outside. In the present embodiment, the depressurizing is carried out such that the internal pressure of the passage formed downstream of the reformer in the hydrogen generator 1 is kept to 3 kPa or lower. This value of the internal pressure changes depending on the configuration of the generator, so that the internal pressure is not limited to this value. An appropriate value of the internal pressure should be set to suit each generator.

Moreover, when the internal pressure of the hydrogen generator 1 is lower than the predetermined value, the control unit 20 causes the raw material supplying unit 8 to supply the raw material to the inside of the reformer. Thus, the internal pressure of the hydrogen generator 1 can be increased (In this case, the on-off valve is closed.). In the present embodiment, pressurizing is carried out such that the internal pressure of the hydrogen generator 1 is kept to 0.5 kPa or higher. This value of the internal pressure changes depending on the configuration of the generator, so that the internal pressure is not limited to this value. An appropriate value of the internal pressure should be set to suit each generator. These depressurizing and pressurizing keep the pressure inside the reformer in a proper state.

While the combustion is stopped, the evaporator 2 is heated by the air supplied from the air supplying unit 11 to the combustor 4. However, the amount of heat supplied to the evaporator 2 differs between while the combustion is stopped after the first combustion operation and while the combustion is stopped after the second and following combustion operations. When the combustion is stopped after the first combustion, the temperature of the entire reformer is not adequately increased, and the reforming catalyst layer 3 tends to be heated locally. Therefore, when the air is supplied to the combustor 4 while the combustion is stopped, the amount of heat taken out from the reforming catalyst layer 3 by the air flowing through the combustion gas passage is not so large, so that an effect of heating portions including the evaporator 2 other than the reformer cannot be expected so much. Therefore, the temperature detected by the reforming temperature detector 6, which is used as a determination condition for proceeding from the stop state of the first combustion operation to the second combustion operation is set to be higher than the temperature detected by the reforming temperature detector 6, which is used as a determination condition for proceeding from the stop state of the second or following combustion operation to the next (third or following) combustion operation. With this, the process can quickly proceed to the second or following combustion operation to quickly heat the entire reformer. In the present embodiment, as shown in FIG. 2, a second predetermined temperature (ignition temperature of the combustor 4) of the temperature detected by the reforming temperature detector 6 is set to 300° C. as the determination condition used to proceed to the second combustion operation, and the second predetermined temperature (ignition temperature of the combustor 4) of the temperature detected by the reforming temperature detector 6 is set to 250° C. as the determination condition used to proceed to the third and following combustion operations. The determination condition (second predetermined temperature) for proceeding to the combustion operation is not limited to these values, and changes depending on the configuration of the hydrogen generator 1, the type of the catalyst, the detecting method of the temperature detector, and the like. Note that the second predetermined temperature is set to be at least higher than such a temperature that the evaporator 2 cannot be increased in temperature by the air which is supplied to the combustor 4 at the time of stopping of the combustion and is heated by the reforming catalyst layer 3.

When the temperature of the reformer becomes a predetermined temperature or lower (150° C. or lower for example), the hydrogen generator 1 of the present embodiment carries out the start-up operation, i.e., the first combustion operation of the combustor 4 is started, and above-described ON and OFF of the combustion operation of the combustor 4 are carried out. This predetermined temperature changes depending on the configuration of the hydrogen generator 1, the type of the catalyst, the detecting method of the temperature detector, and the like.

When the temperature detected by the reforming temperature detector 6 becomes the second predetermined temperature or lower, the control unit 20 causes the air supplying unit 11 to change the amount of air supplied from the air supplying unit 11 to the combustor 4 to the flow rate suitable for the combustion, and causes the raw material supplying unit 8 to start supplying the raw material to the reformer to supply the combustion fuel to the combustor 4 again. With this, ignition is carried out again by an ignition device (not shown) in the combustor 4, and the process can proceed to the combustion operation in the combustor 4.

When the temperature detected by the reforming temperature detector 6 becomes the first predetermined temperature in an n-th combustion operation, the control unit 20 determines whether or not the temperature of the evaporator 2 is the water-evaporable temperature using the evaporator temperature detector 7. Hereinafter, the same operation as above is repeatedly carried out until the temperature of the evaporator 2 becomes the predetermined threshold or higher, i.e., the water-evaporable temperature or higher.

In a case where the temperature of the evaporator 2 is increased to the predetermined threshold or higher while the combustion operation of the combustor 4 is stopped, and the reforming catalyst layer 3 is cooled down by the air, the process may proceed to the combustion operation of the combustor 4 without decreasing the temperature of the reformer (reforming catalyst layer 3) to the determination condition for proceeding to the combustion operation.

FIG. 3 shows results obtained by compiling the operating conditions in the first temperature increasing step of the hydrogen generator 1 in the present embodiment described above. As shown in FIG. 3, the raw material flow rate, a fire extinguishing temperature (first predetermined temperature), the ignition temperature (second predetermined temperature), the air ratio, and the water-evaporable temperature are changed among the first combustion operation, the second combustion operation, and the third and following combustion operations. By these operations, the time taken to carry out the first temperature increasing step (to be specific, the time taken to carry out the start-up operation) is expected to be shortened. To be specific, in the present embodiment, as show in FIG. 2, the time taken to carry out the first temperature increasing step is about 28 minutes, which is shorter than that in Comparative Example below.

Moreover, since the temperature of the evaporator 2 increases quickly, the number of times of the stop (OFF) of the combustion operation of the combustor 4 is expected to be reduced, and the heat load repeatedly applied to the reformer is expected to be reduced. To be specific, in the present embodiment, the number of times of OFF of the combustion operation is twice, which is smaller than that in Comparative Example below.

As Comparative Example with respect to the start-up operation of the hydrogen generator 1 of the present embodiment, the start-up operation (the first temperature increasing step and the second temperature increasing step) of the hydrogen generator is carried out using two operating conditions different from those of the present embodiment.

Figure 4:
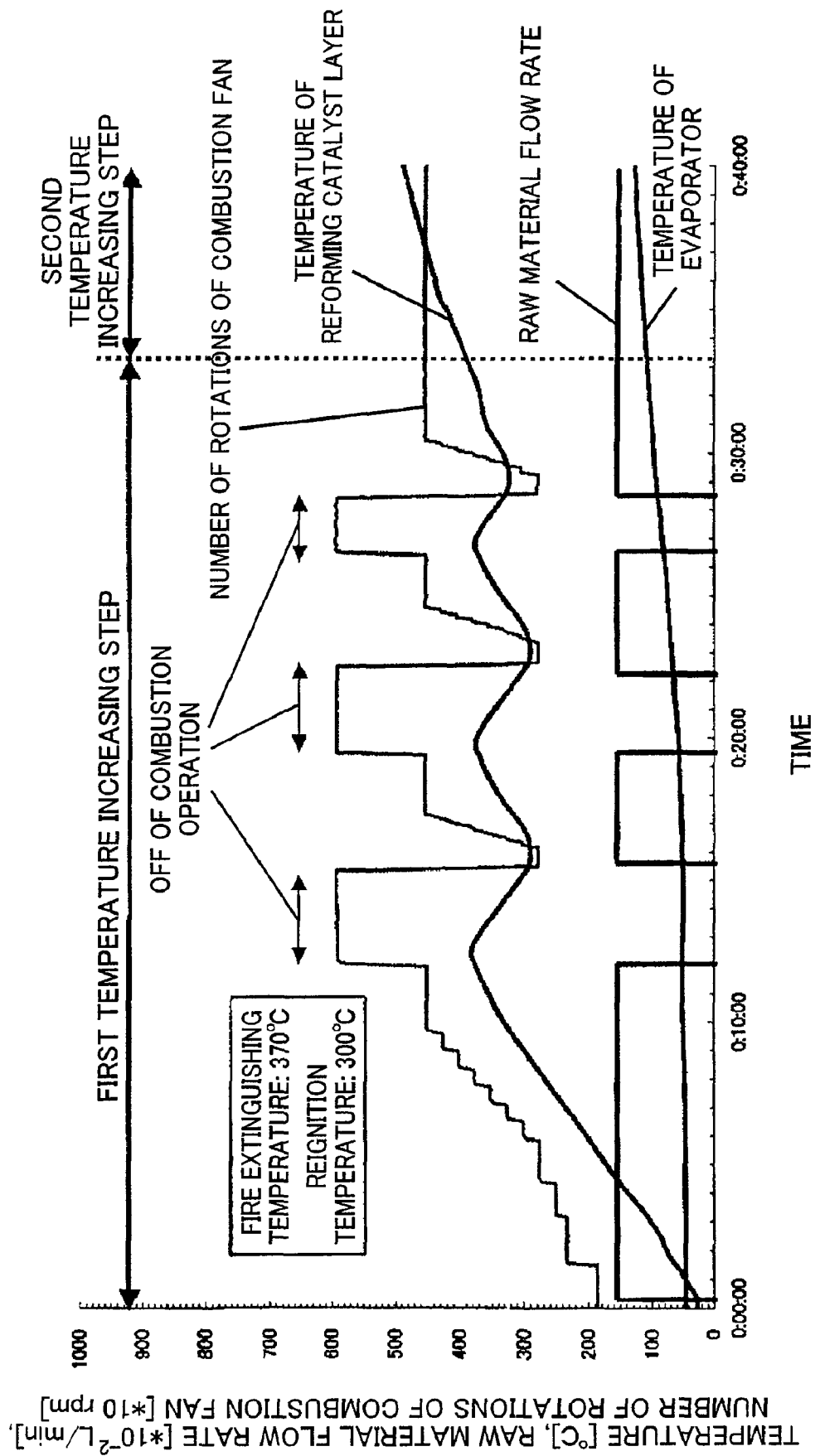
FIG. 4 is a diagram schematically showing time-lapse changes of various operating conditions in the first temperature increasing step and the second temperature increasing step in another start-up operation using the hydrogen generator of Embodiment 1 of the present invention.

FIG. 4 is a diagram schematically showing time-lapse changes of various operating conditions in the first temperature increasing step and (in up to an intermediate point of) the second temperature increasing step in another start-up operation using the hydrogen generator.

As the operating conditions of the hydrogen generator shown in FIG. 4, the first predetermined temperature that is the reference temperature for determining whether or not the evaporator 2 can evaporate the water is set to 370° C., and the temperature (second predetermined temperature) at which the combustion operation is restarted is set to 300° C. In addition, the raw material flow rate is fixed to 1.5 NLM, the air ratio is fixed to a standard, and the water-evaporable temperature is fixed to 85° C.

It can be seen in FIG. 4 that the time taken to carry out the first temperature increasing step is about 33 minutes, and the number of times of OFF of the combustion operation is three times. Since the time taken to carry out the first temperature increasing step in the present embodiment is about 28 minutes, it is estimated that the time taken to start up the hydrogen generator can be shortened about 5 minutes (about 15%). Moreover, since the number of times of OFF of the combustion operation in the present embodiment is twice, it is estimated that the number of times of OFF of the combustion operation can be reduced once.

Figure 5:
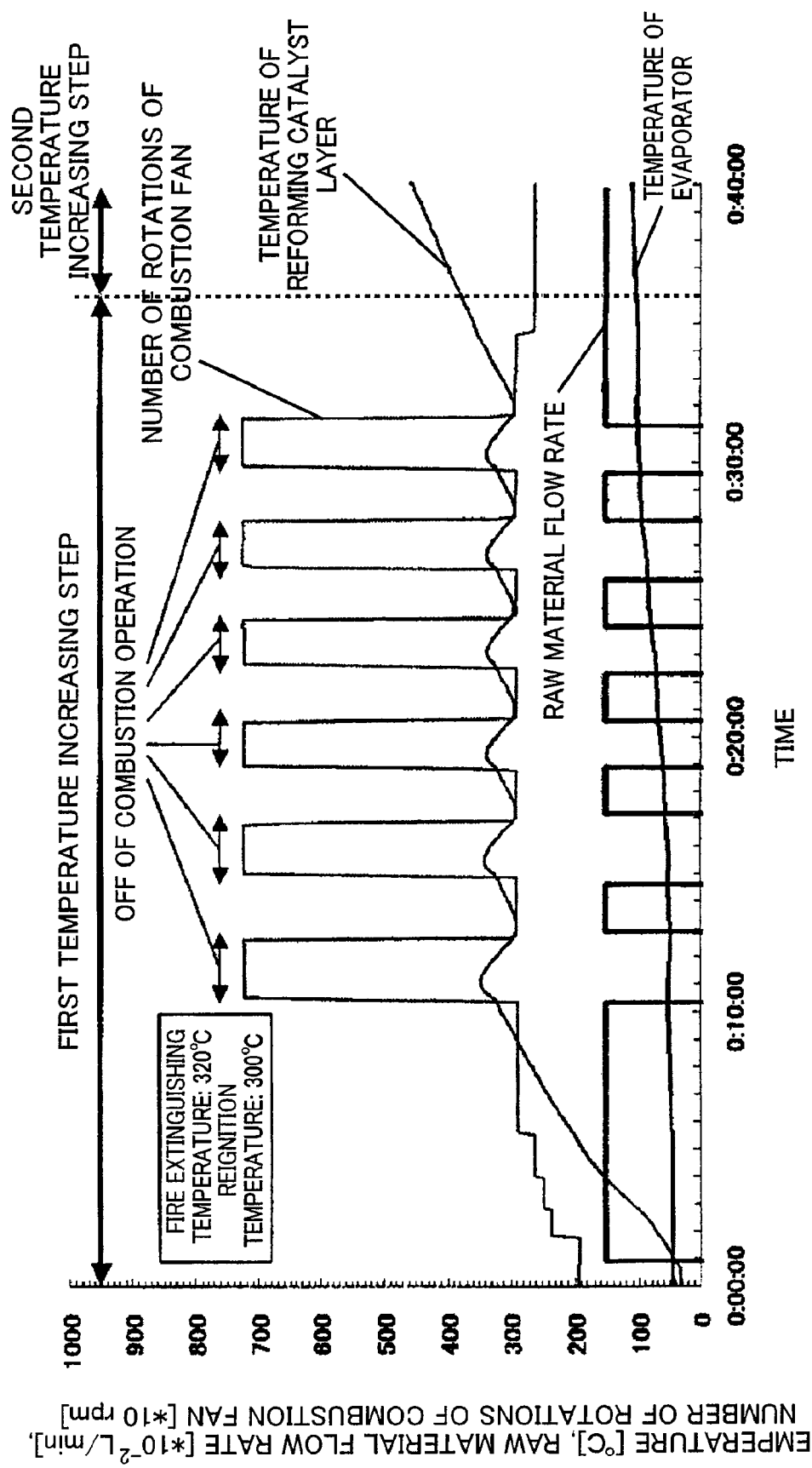
FIG. 5 is a diagram schematically showing time-lapse changes of various operating conditions in the first temperature increasing step and the second temperature increasing step in still another start-up operation using the hydrogen generator of Embodiment 1 of the present invention.

FIG. 5 is a diagram schematically showing time-lapse changes of various operating conditions in the first temperature increasing step and (in up to an intermediate point of) the second temperature increasing step in still another start-up operation using the hydrogen generator.

As the operating conditions of the hydrogen generator shown in FIG. 5, the first predetermined temperature that is the reference temperature for determining whether or not the evaporator 2 can evaporate the water is set to 320° C., and the temperature (second predetermined temperature) at which the combustion operation is restarted is set to 300° C. In addition, the raw material flow rate is fixed to 1.5 NLM, the air ratio is fixed to the standard, and the water-evaporable temperature is fixed to 85° C. That is, in accordance with the operating conditions, the temperature difference between the first predetermined temperature and the second predetermined temperature is small, i.e., 20° C.

It can be seen in FIG. 5 that the time taken to carry out the first temperature increasing step is about 36 minutes, and the number of times of OFF of the combustion operation is six times. Since the time taken to carry out the first temperature increasing step in the present embodiment is about 28 minutes, it is estimated that the time taken to start up the hydrogen generator can be shortened about 8 minutes (about 22%). Moreover, since the number of times of OFF of the combustion operation in the present embodiment is twice, it is estimated that the number of times of OFF of the combustion operation can be reduced four times.

The present embodiment explains the first temperature increasing step of the hydrogen generator 1 by dividing the combustion operation of the combustor 4 into the first combustion operation, the second combustion operation, and the third and following combustion operations. However, the above number of times of the combustion operation is just one example.

For example, the control unit 20 may control the combustion operation of the combustor 4 such that the heat amount per unit time by the combustor 4 in the first combustion operation is larger than the heat amount per unit time in k-th (k>1) and following combustion operations. Similarly, the control unit 20 may control the combustion operation (fire extinguishing temperature) of the combustor 4 such that the temperature of the reformer (reforming catalyst layer 3) when carrying out OFF of the first combustion operation of the combustor 4 is lower than the temperature of the reformer (reforming catalyst layer 3) when carrying out OFF of the k-th (k>1) and following combustion operations. The above-described "k-th" is not limited to "second" exemplified in the present embodiment, but may be any number as long as it is the second or more.

Moreover, the control unit 20 may control the combustion operation (ignition temperature) of the combustor 4 such that the temperature of the reformer (reforming catalyst layer 3) when carrying out ON of the n-th and following combustion operations of the combustor 4 is lower than the temperature of the reformer (reforming catalyst layer 3) when carrying out ON of an m-th (n>m>1) combustion operation of the combustor 4. The above-described "m-th" is not limited to "second" in the present embodiment, but may be any number as long as it is the second or more. Moreover, the above described "n-th and following" is not limited to "third" exemplified in the present embodiment, and may be any number as long as it is more than the "m-th".

Embodiment 2

Hereinafter, Embodiment 2 will be explained in reference to the drawings.

Figure 6:
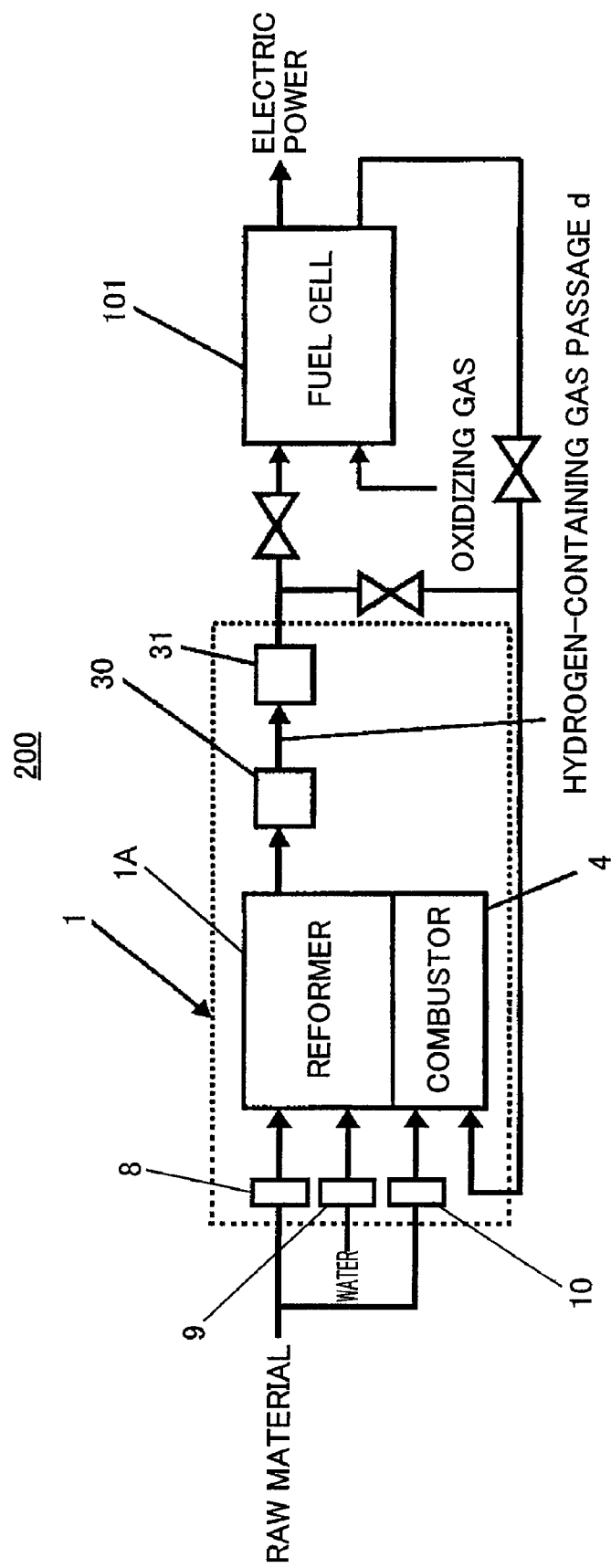
FIG. 6 is a schematic diagram showing the configuration of a fuel cell system in Embodiment 2 of the present invention.

FIG. 6 is a schematic block diagram showing the configuration of the fuel cell system according to Embodiment 2 of the present invention. A fuel cell system 200 includes the hydrogen generator 1 and a fuel cell 101 as main components. The fuel cell 101 is, for example, a polymer electrolyte fuel cell.

The hydrogen generator 1 is the hydrogen generator 1 of Embodiment 1, but includes a shift converter 30 and a CO remover 31 in addition to the above-described reformer (shown as "reformer 1A" in FIG. 6) and the combustor 4.

Specifically, the hydrogen-containing gas passage c of FIG. 1 is connected to the shift converter 30, and the shift converter 30 and the CO remover 31 are connected to each other by a hydrogen-containing gas passage d. In the hydrogen generator 1 configured as above, the hydrogen-containing gas generated by the reforming catalyst layer 3 is supplied to the shift converter 30 via the hydrogen-containing gas passage c, and herein, a CO concentration of the hydrogen-containing gas is reduced by a shift reaction of carbon monoxide in the hydrogen-containing gas. The hydrogen-containing gas delivered from the shift converter 30 is supplied to the CO remover 31, and herein, the CO concentration of the hydrogen-containing gas is further reduced by an oxidation reaction of carbon monoxide in the hydrogen-containing gas. Since the shift converter 30 and the CO remover 31 carry out the above CO reducing process, the hydrogen-containing gas whose CO concentration is low can be obtained in the hydrogen generator 1.

Note that the raw material supplying unit 8 of FIG. 1 is disposed on a passage through which the raw material is supplied from a raw material supply source to the reformer 1A, and the fuel supplying unit 10 of FIG. 1 is disposed on a passage which branches off from the above passage and extends to the combustor 4.

In the fuel cell system 200, the hydrogen generator 1 is connected to the fuel cell 101 to supply the hydrogen-containing gas to the fuel cell 101. In addition, an oxidizing gas is supplied to the fuel cell 101. Hydrogen in the hydrogen-containing gas and oxygen in the oxidizing gas react with each other in the fuel cell 101 to generate electric power.

In the operation of the fuel cell system 200, first, the hydrogen generator 1 carries out the first temperature increasing step, the second temperature increasing step, and the hydrogen generating step as described above. These steps have already been described in Embodiment 1, so that explanations thereof are omitted here. As described in Embodiment 1, the hydrogen generator 1 can shorten the time taken to carry out the start-up operation, and can realize the operation which is high in durability performance. The start-up operation of the hydrogen generator 1 in the present embodiment is such an operation that: the control unit 20 (see FIG. 1) outputs the start-up command; the first temperature increasing step and the second temperature increasing step are carried out; the reformer 1A starts the hydrogen generating step; the shift converter 30 and the CO remover 31 reduces carbon monoxide in the hydrogen-containing gas to a level that the hydrogen-containing gas can be supplied to the fuel cell 101; and the supply of the hydrogen-containing gas, which is generated by the hydrogen generator 1, to the fuel cell starts.

When the carbon monoxide in the hydrogen-containing gas is adequately reduced as above, the hydrogen-containing gas generated by the hydrogen generator 1 is supplied as the electric power generating fuel to a fuel electrode of the fuel cell 101. Meanwhile, the air is supplied as the oxidizing gas to an air electrode of the fuel cell 101. In the fuel cell 101, the supplied hydrogen gas and air react with each other (hereinafter referred to as an electric power generating reaction) to generate electric power, and this electric power generating reaction generates heat. The electric power obtained by the electric power generating reaction is supplied to and used by an electric power load terminal (not shown). Moreover, the heat generated by the electric power generating reaction is collected by heat collecting means (not shown), and utilized in various applications. For example, the heat can be utilized for hot water supply. Moreover, an unused hydrogen gas (so called a fuel off gas), which is not utilized in the electric power generating reaction, is discharged from the fuel electrode of the fuel cell 101 to be supplied as the combustion fuel to the combustor 4 of the hydrogen generator 1.

Since the time taken to start up the hydrogen generator 1 can be shortened in the fuel cell system 200 of the present embodiment as described above, the hydrogen gas can be supplied to the fuel cell 101 in a short period of time. Therefore, the electric power energy and the heat energy can be supplied from the fuel cell system 200 in a short period of time. On this account, it is possible to realize the fuel cell system 200 which excels in economical efficiency.

Embodiment 2 has explained an example in which the hydrogen generator 1 described in Embodiment 1 is utilized as a hydrogen gas supplying device of the fuel cell system 200. However, the hydrogen generator 1 described in Embodiment 1 is applicable to applications other than the hydrogen gas supplying device of the fuel cell system.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

INDUSTRIAL APPLICABILITY

The hydrogen generator according to the present invention is utilizable to generate hydrogen used in various applications, and for example, is useful to generate a hydrogen gas used as a fuel gas of a fuel cell. Moreover, a fuel cell power generating system including the hydrogen generator is utilizable as an electric power generator in various applications, and for example, is useful as a domestic fuel cell cogeneration system.

The invention claimed is:

1. A hydrogen generator comprising: a reformer which generates a hydrogen-containing gas from a raw material and steam; a combustor which heats the reformer; an evaporator which generates the steam by utilizing heat of a combustion gas after the reformer is heated by the combustion gas; and a control unit,
the hydrogen generator being controlled such that ON and OFF of a combustion operation of the combustor are repeated in a start-up operation of the hydrogen generator, and a temperature of the reformer is kept to a predetermined temperature or lower, wherein
the control unit controls the combustion operation such that a heat amount per unit time by the combustor in a first combustion operation is larger than a heat amount per unit time by the combustor in k-th (k>1) and following combustion operations.

2. The hydrogen generator according to claim 1, wherein the control unit controls the combustion operation such that the temperature of the reformer when carrying out OFF of the first combustion operation of the combustor is lower than the temperature of the reformer when carrying out OFF of the k-th (k>1) and following combustion operations.

3. The hydrogen generator according to claim 1, wherein the control unit controls the combustion operation such that the temperature of the reformer when carrying out ON of n-th and following combustion operations of the combustor is lower than the temperature of the reformer when carrying out ON of an m-th (n>m>1) combustion operation of the combustor.

4. The hydrogen generator according to claim 1, further comprising a water supplying unit which supplies water to the evaporator, wherein
when a temperature of the evaporator becomes a predetermined threshold or higher, the control unit does not carry out OFF of the combustion operation of the combustor but continues the combustion operation of the combustor, and causes the water supplying unit to start supplying the water to the evaporator.

5. The hydrogen generator according to claim 4, wherein the predetermined threshold in the first combustion operation of the combustor is higher than the predetermined threshold in m-th (m>1) and following combustion operations.

6. The hydrogen generator according to claim 1, wherein:
the combustor includes a burner which burns a combustion fuel and air, a fuel supplying unit which supplies the combustion fuel to the burner, and an air supplying unit which supplies the air to the burner; and
the control unit controls the combustion operation such that an air ratio of the burner in m-th (m>1) and following combustion operations is higher than an air ratio of the burner in the first combustion operation.

7. The hydrogen generator according to claim 6, wherein an amount of the air supplied to the burner while the combustion operation is stopped is larger than an amount of the air supplied to the burner during the combustion operation.

8. The hydrogen generator according to claim 6, wherein the air ratio at a time of ignition of the burner is lower than the air ratio in the combustion operation after the ignition of the burner.

9. The hydrogen generator according to claim 7, wherein the air ratio at a time of ignition of the burner is lower than the air ratio in the combustion operation after the ignition of the burner.

10. The hydrogen generator according to claim 7, further comprising: a fuel gas passage through which a gas delivered from the reformer is supplied to the combustor; and a valve which is disposed on the fuel gas passage as the fuel supplying unit, wherein the control unit opens the valve when an internal pressure of the reformer reaches a predetermined threshold or higher while the combustion operation of the combustor is stopped.

11. The hydrogen generator according to claim 7, further comprising a raw material supplying unit which supplies the raw material to the reformer, wherein the control unit causes the raw material supplying unit to supply the raw material into the reformer when an internal pressure of the reformer becomes a predetermined threshold or lower while the combustion operation of the combustor is stopped.

12. A fuel cell system comprising: the hydrogen generator according to claim 1; and a fuel cell which generates electric power by using the hydrogen-containing gas supplied from the hydrogen generator and an oxidizing gas.

* * * * *